W. A. HAWKES.
RAILROAD DUMPING CAR.
No. 24,301. Patented June 7, 1859.
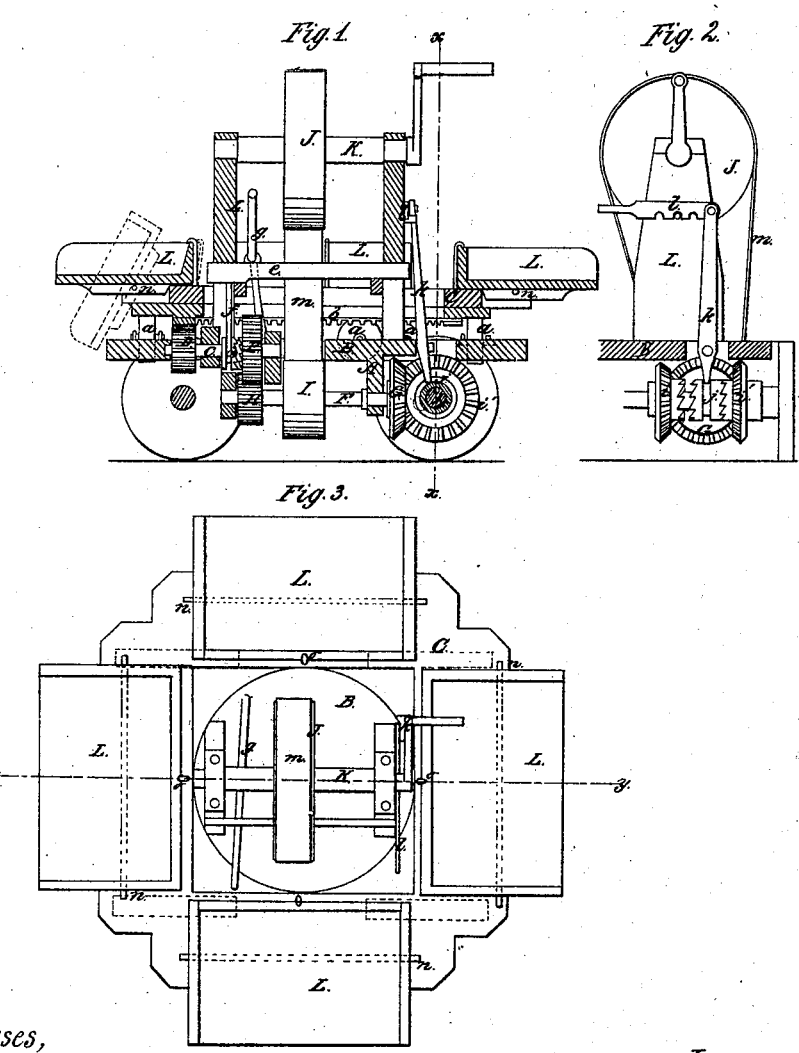

UNITED STATES PATENT OFFICE.

W. A. HAWKES, OF CORINTH, NEW YORK.

ROTATING DUMPING-CAR.

Specification of Letters Patent No. 24,301, dated June 7, 1859.

*To all whom it may concern:*

Be it known that I, WILLIAM A. HAWKES, of Corinth, in the county of Saratoga and State of New York, have invented a new and Improved Dumping-Car for Carrying Dirt, Gravel, &c., on Railroads and Used in Repairing and Constructing the Same; and I do hereby declare that the following is a full, clear, and exact description of the same, reference being had to the annexed drawings, making a part of this specification, in which—

Figure 1, is a vertical section of my invention taken in the line $y$, $y$, Fig. 3. Fig. 2, is also a vertical section of do., taken in the line $x$, $x$, Fig. 1. Fig. 3, is a plan or top view of do.

Similar letters of reference indicate corresponding parts in the several figures.

To enable those skilled in the art to fully understand and construct my invention I will proceed to describe it.

A, represents a car truck which may be constructed in any proper way, said truck having a circular bed B, on its upper surface. The truck may be provided with four or more wheels according to its size or length. In the bed B, a series of rollers $a$, are fitted or placed in annular form and a platform C, is placed on said rollers. To the under side of the platform C, an annular rack or a toothed rim $b$, is attached, into which rack or rim a toothed wheel D, in the bed B, gears. The wheel D, is placed on a shaft $c$, and on the shaft $c$, a toothed wheel E, is placed loosely and connected with said shaft $c$, when necessary by a clutch $d$, which is connected with a sliding bar $e$, by means of a metal strap $f$. The bar $e$, has a lever $g$, connected with it, by which lever the bar $e$, is actuated, and the wheel E, connected with or disconnected from the shaft $c$, when desired.

On one of the axles $h$, of the truck two bevel wheels $i$, $i'$, are placed loosely and a clutch $j$, is placed on the axle between the two wheels, said clutch being actuated by a lever $k$, which extends upward through the bed and has a notched bar $l$, pivoted to its upper end. In the truck A, a shaft F, is placed longitudinally, said shaft having a toothed wheel G, on one end which wheel gears into the wheels $i$, $i'$, on the axle $h$. On the opposite end of the shaft a pinion H, is placed, said pinion gearing into the wheel E, on shaft $c$. A pulley I, is also placed on the shaft F, and a belt $m$, passes around said pulley, said belt also passing around a pulley J, on a shaft K, which is fitted in the upper part of a frame L, attached to the bed B.

A steam engine may be placed on the bed B, from which the shaft K, may be driven, and on the platform C, a series of boxes L, are placed, said boxes being fitted on shafts or axes $n$, so that they may turn or tilt thereon. The boxes being retained in proper position or prevented from tilting casually by means of catches $o$, arranged in any proper way at their back ends.

The operation is as follows. The boxes are secured in a horizontal position by the catches $o$, and are filled with the earth, gravel or other material they are to carry, in any suitable way. The car is then propelled along by the application of power to the crank of the shaft K, motion being communicated to the axle $h$, from shaft K, through the medium of the belt $m$, and gearing G, $i$ or $i'$, either of the wheels $i$, or $i'$, being connected with the shaft $h$, according to the direction in which the car is to move, and the direction of the movement of the car may be changed or reversed at any time by merely actuating the clutch $j$, through the medium of lever $k$. When the earth, or other material in the boxes L, is to be dumped, the lever $k$, is moved so that the clutch $j$, will be out of gear with both wheels $i$, $i'$. Motion therefore will not be communicated to the axle $h$, and the car will stop. The lever $g$, is then actuated and the sliding bar $e$, thereby moved so that the clutch $d$, will be thrown in gear with the wheel E, and the platform C, rotated. As the boxes L, pass successively around to the desired spot the movement of the platform is momentarily stopped by actuating lever $g$, so that each box may be tilted and its contents discharged.

Having described my invention, what I claim and desire to secure by Letters-Patent, is:

The arrangement and combination of the rotating platform C, provided with dumping boxes L, with the shaft K, and gearing D, E, H, (b), G, (i), (i'), (m), and the clutches (d, j), substantially as herein shown and described, so that the car may be propelled and the dumping boxes rotated by turning shaft K, as desired, all as set forth.

WILLIAM A. HAWKES.

Witnesses:
D. B. IDE,
N. W. BUCKMASTER.